US012110853B2

(12) United States Patent
Hirao et al.

(10) Patent No.: US 12,110,853 B2
(45) Date of Patent: Oct. 8, 2024

(54) ENGINE

(71) Applicant: Yanmar Holdings Co., Ltd., Osaka (JP)

(72) Inventors: Yu Hirao, Osaka (JP); Yuki Kobayashi, Osaka (JP)

(73) Assignee: YANMAR HOLDINGS CO., LTD., Osaka (JP)

(*) Notice: Subject to any disclaimer, the term of this patent is extended or adjusted under 35 U.S.C. 154(b) by 0 days.

(21) Appl. No.: 18/119,144

(22) Filed: Mar. 8, 2023

(65) Prior Publication Data

US 2023/0287853 A1 Sep. 14, 2023

(30) Foreign Application Priority Data

Mar. 10, 2022 (JP) ................................ 2022-036952

(51) Int. Cl.

| | |
|---|---|
| ***F02M 55/02*** | (2006.01) |
| ***F02B 75/22*** | (2006.01) |
| ***F02M 55/00*** | (2006.01) |

(52) U.S. Cl.

CPC ........... *F02M 55/025* (2013.01); *F02B 75/22* (2013.01); *F02M 55/005* (2013.01)

(58) Field of Classification Search

CPC ...... F02M 55/025; F02M 55/005; F02B 75/22
USPC ....................................... 123/52.1, 54.4–54.7
See application file for complete search history.

(56) References Cited

U.S. PATENT DOCUMENTS 4,412,513 A 11/1983 Obermayer et al.

FOREIGN PATENT DOCUMENTS

| | | | | | |
|---|---|---|---|---|---|
| CN | 209444443 | U | * | 9/2019 | |
| EP | 0644326 | A1 | | 3/1995 | |
| EP | 2402589 | B1 | * | 8/2015 | .............. B62J 37/00 |
| JP | H1144222 | A | * | 2/1999 | ............ F02B 61/045 |
| JP | H11062770 | A | | 3/1999 | |
| JP | H11229940 | A | * | 8/1999 | .............. F02B 75/22 |
| JP | H11229991 | A | | 8/1999 | |
| JP | 2010-229942 | A | | 10/2010 | |
| WO | WO-2013014745 | A1 | * | 1/2013 | ............... B60K 1/00 |

OTHER PUBLICATIONS

JP H1144222A (Masafumi et al.) (Feb. 16, 1999) (Machine Translation) (Year: 1999).*

European Search Report dated Jul. 10, 2023 issued in EP Application No. 23159652.9.

* cited by examiner

*Primary Examiner* — Mahmoud Gimie

(74) *Attorney, Agent, or Firm* — NORTON ROSE FULBRIGHT US LLP

(57) ABSTRACT

An engine is an engine provided with a first cylinder row and a second cylinder row. The engine includes: a controller that is placed in an intra-bank area positioned between the first cylinder row and the second cylinder row; and a fuel pipe that is placed below the controller in the intra-bank area and included in a passage of a fuel. Ina plan view from an up and down direction, a joint portion possessed by the fuel pipe is displaced from the controller.

17 Claims, 10 Drawing Sheets

ENGINE

CROSS-REFERENCE TO RELATED APPLICATIONS

This application claims priority under 35 U.S.C. § 119 to JP Application No. 2022-036952 filed Mar. 10, 2022, the entire contents of which are hereby incorporated by reference.

TECHNICAL FIELD

The present invention relates to an engine.

BACKGROUND ART

As a conventional layout of a fuel supply system of a V-type engine provided with two cylinder rows, a configuration in which a fuel supply piping that supplies a fuel to an injector is provided in a V-bank space is known (see, for example, Patent Document 1). In the configuration disclosed in Patent Document 1, a fuel pump used to supply the fuel is provided outside the V-bank space.

PRIOR ART DOCUMENT

Patent Document

Patent Document 1: Japanese Unexamined Patent Application Publication No. 2010-229942

SUMMARY OF INVENTION

Technical Problem

For example, an engine used in a ship, in view of installation in an engine chamber, is required to be downsized such as minimizing in height. It is conceivable that, in response the above, for example, a fuel supply system including a fuel pump and an engine controller controlling the engine should be placed in a space inside the V-bank. However, in this case, there is a concern about reduced workability and a problem related to an electric wiring.

It is an object of the present invention to provide a technology appropriate for downsizing an engine provided with two cylinder rows.

Solution to Problem

An exemplary engine of the present invention is an engine provided with a first cylinder row and a second cylinder row. The engine includes: a controller that is placed in an intra-bank area positioned between the first cylinder row and the second cylinder row; and a fuel pipe that is placed below the controller in the intra-bank area and included in a passage of a fuel. In plan view from an up and down direction, a joint portion possessed by the fuel pipe is displaced from the controller.

Advantageous Effects of Invention

According to the exemplary invention, it is possible, in an engine provided with two cylinder rows, to improve workability of maintenance work, for example while downsizing the engine.

DESCRIPTION OF EMBODIMENTS

Figure 1:
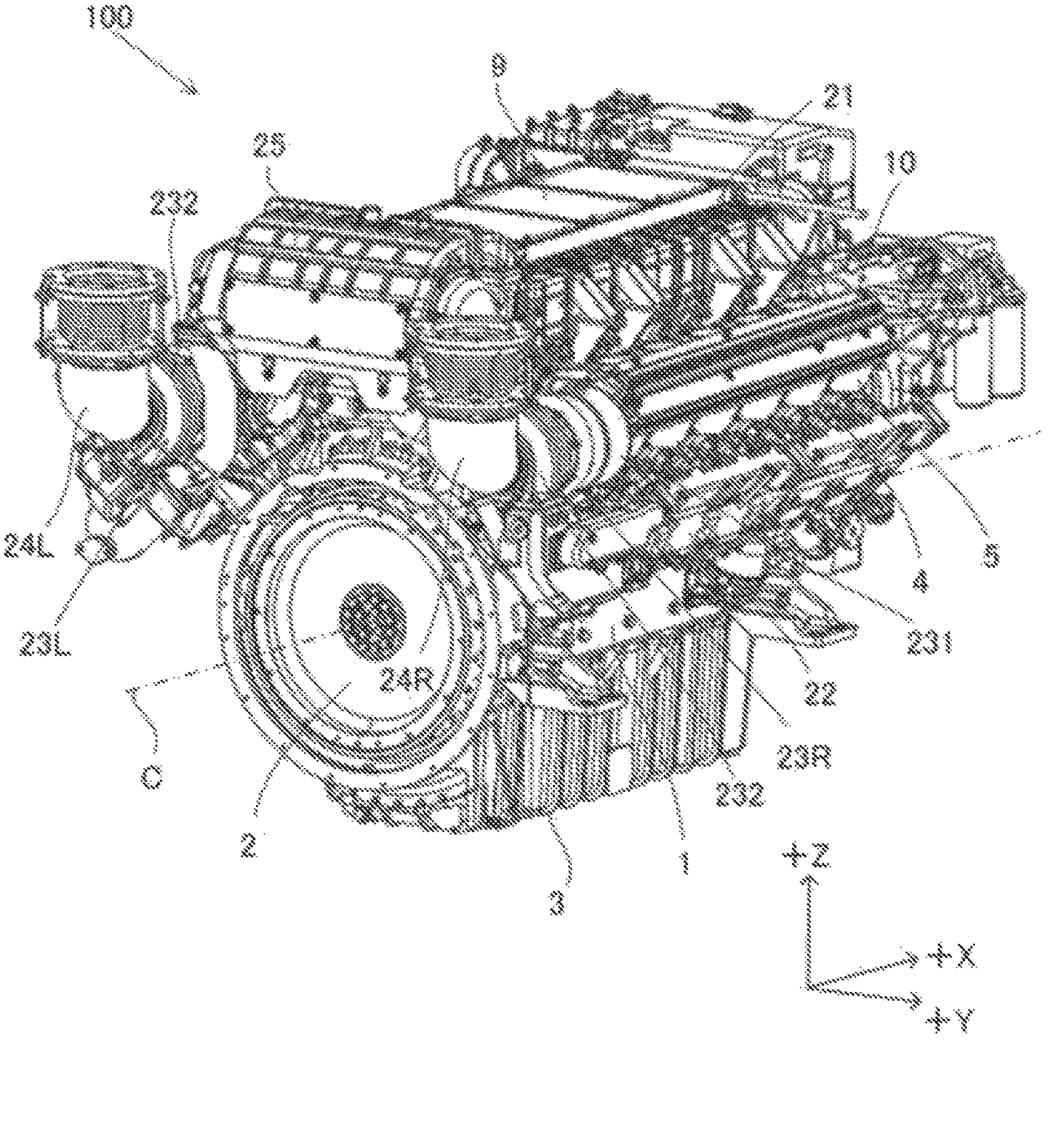
FIG. 1 is a schematic perspective view showing a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and the −Y side is defined as the left side. +Z side is defined as an upper side, and −Z side is defined as a lower side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the lower side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction.

<1. Overview of Engine>

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
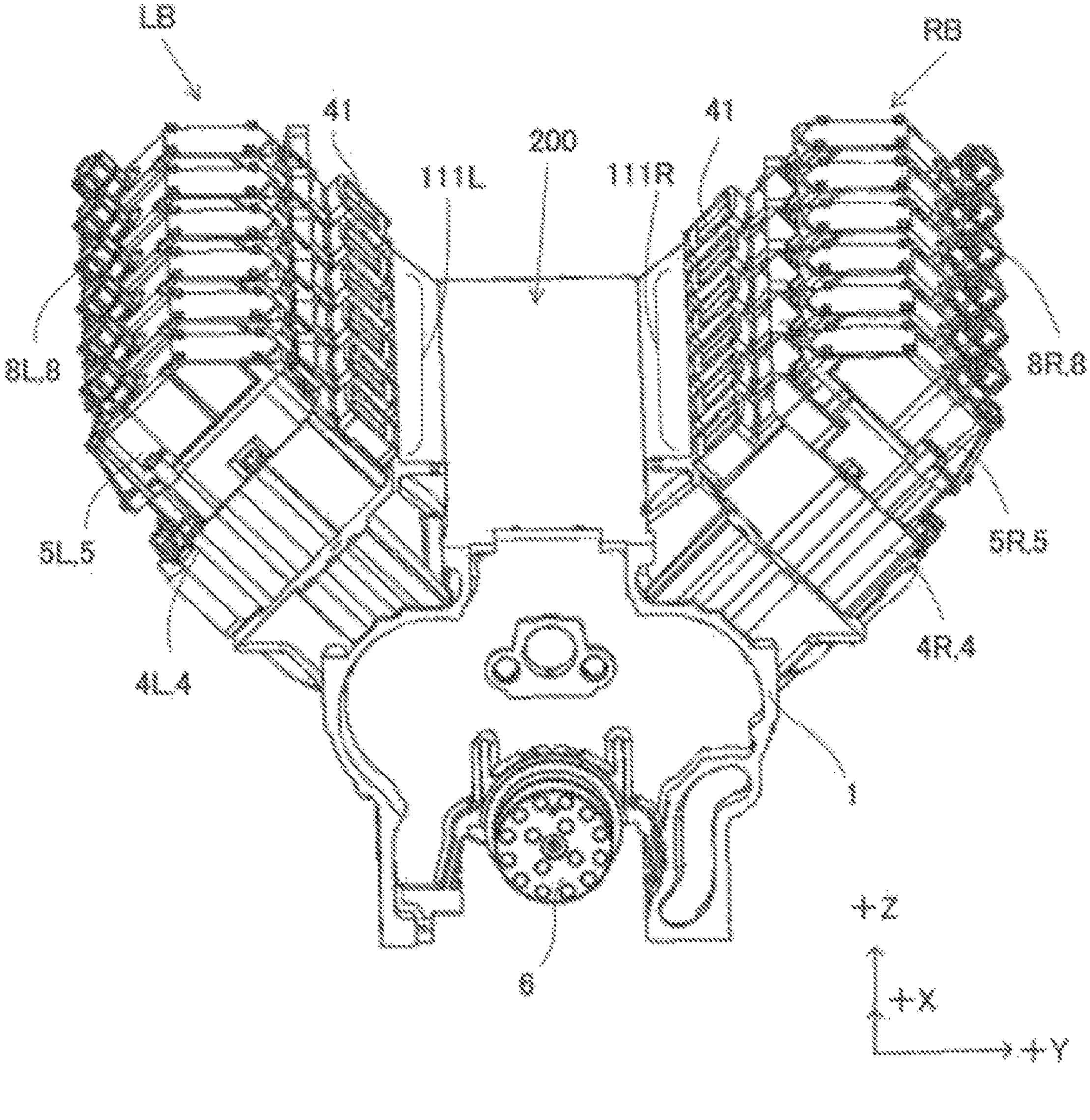
FIG. 2 is a schematic perspective view extracting and showing a portion including a cylinder block, a head block, and a head cover which are provided in the engine.
Figure 3:
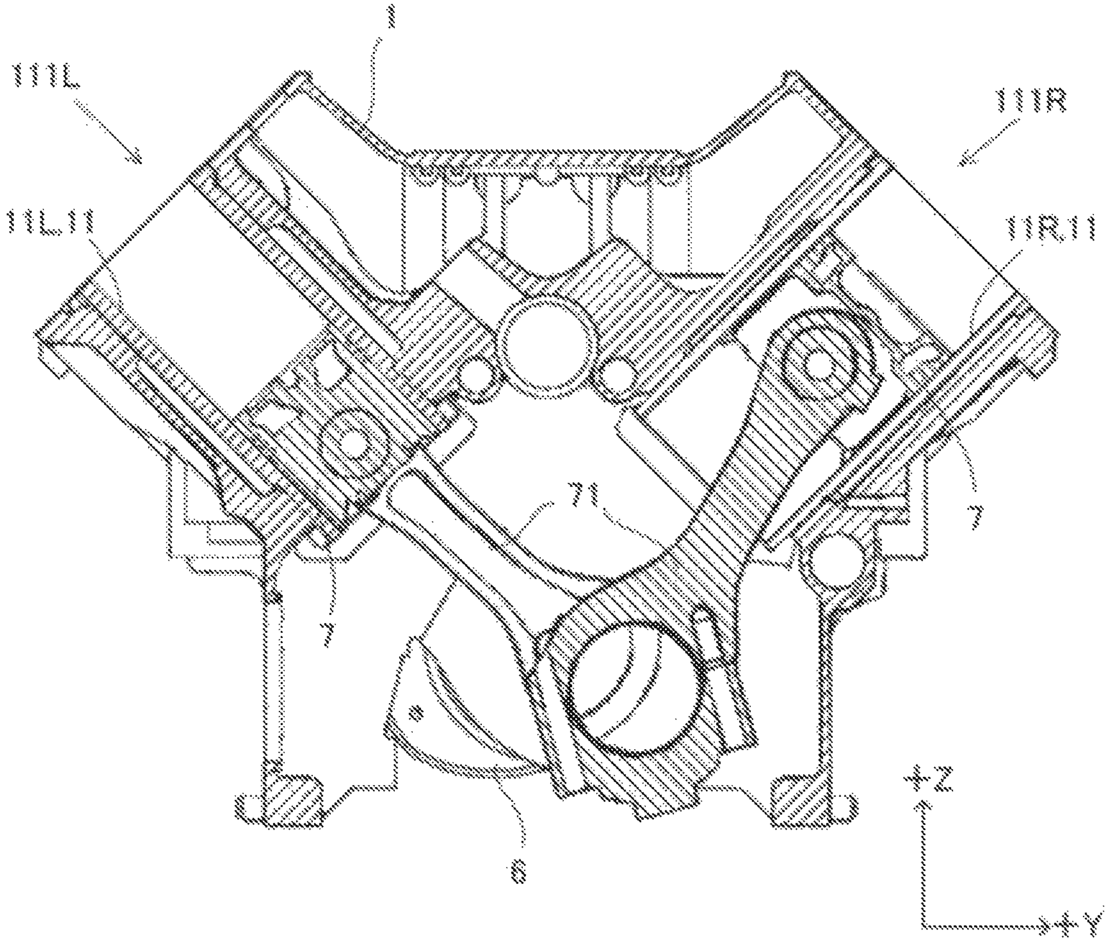
FIG. 3 is a schematic cross-sectional view of a cylinder block portion provided in the engine.

As shown in FIG. 1, the engine 100 includes a cylinder block 1, a head block 4, and a head cover 5. FIG. 2 is a schematic perspective view extracting and showing a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6 and a piston 7 which extend in the front and back direction are placed inside the cylinder block 1. The interior of the cylinder block 1 connects to the interior of the oil pan 3 which is placed at the lower side and stores a lubricant oil. A flywheel 2 (see FIG. 1) is mounted to the back end of the crankshaft 6. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has a right cylinder row 111R with the plural right cylinders 11R arranged in the front and back direction, and a left cylinder row 111L with the plural left cylinders 11L arranged in the front and back direction. That is, the engine 100 has a first cylinder row 111R and a second cylinder row 111L. The right cylinder row 111R and the left cylinder row 111L form a V-shaped bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. The exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover 5 is fastened to head block 4 by using a screw. Each head cover 5 covers intake and exhaust valves (not shown) placed at the head block 4. An injector 8 is mounted on each head cover 5. The injector 8's one end portion, where an injection port for injecting a fuel is placed, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and left head cover 5L are each six. Also, the number of right injectors 8R placed at the right head cover 5R and the number of left injectors 8L placed at the left head cover 5L are each six.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank.

An intra-bank area 200 is formed between the right bank RB and the left bank LB in the right and left direction.

Returning to FIG. 1, the engine 100 has an upper face cover 9 and a lateral face cover 10. The upper face cover 9 prevents water from splashing, due to condensation, for example, onto a controller 26 (see FIG. 4, etc., below) and the like placed inside. The lateral face cover 10 prevents the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is equipped with a pair of right and left lateral face covers 10.

Figure 4:
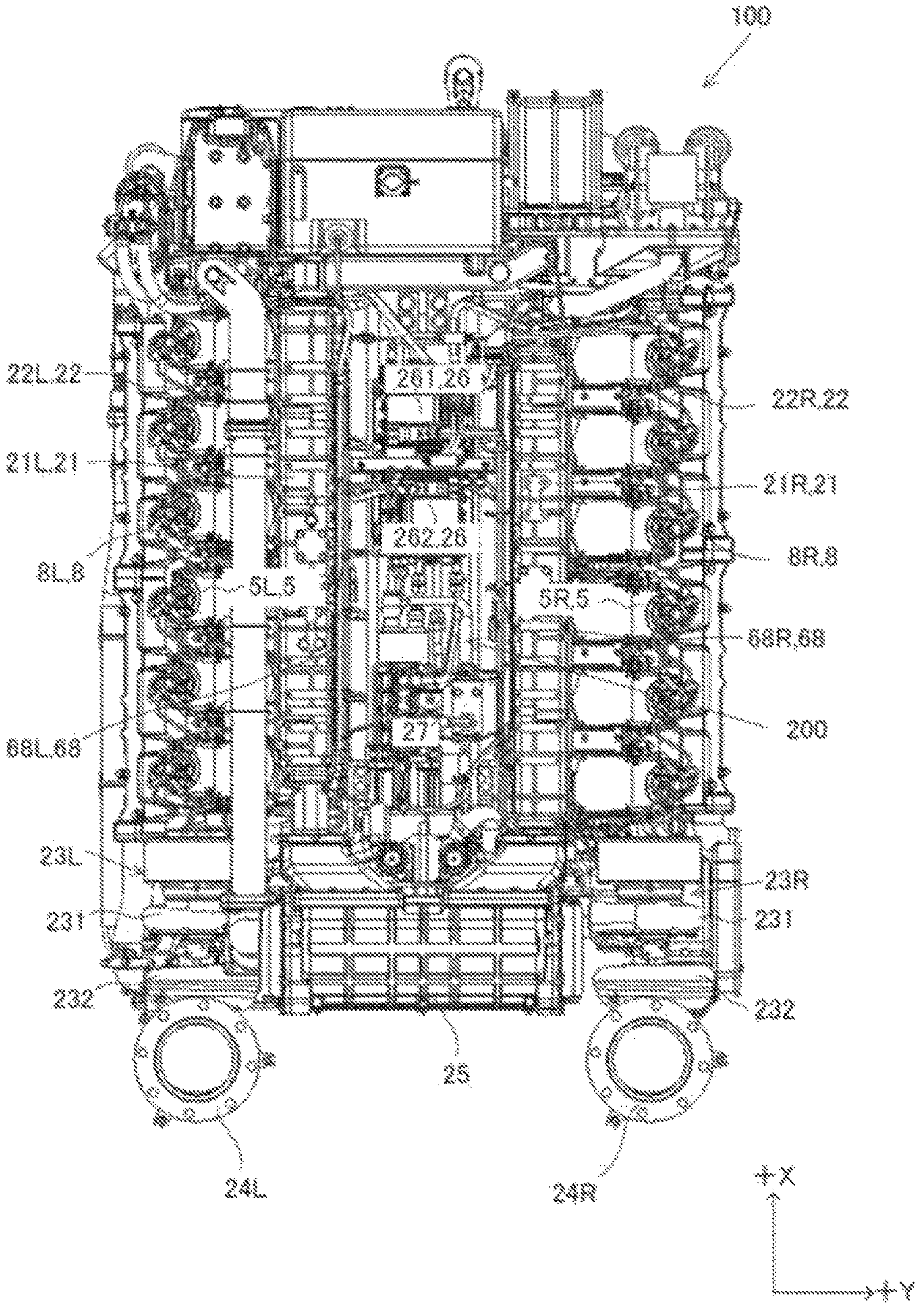
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face cover 10 are omitted. As shown in FIGS. 1 and 4, the engine 100 includes an intake manifold 21 and an exhaust manifold 22.

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L.

The right intake manifold 21R is placed above the respective intake ports 41 (see FIG. 2) of the plural right head blocks 4R which are arranged in the front and back direction. The interior of the right intake manifold 21R and the respective right cylinders 11R are connected via the respective intake ports 41. The left intake manifold 21L is placed above the respective intake ports 41 of the plural left head blocks 4L which are arranged in the front and back direction. The interior of the left intake manifold 21L and the respective left cylinders 11L are connected via the respective intake ports 41.

In detail, an intake valve (not shown) is interposed between each intake port 41 and each cylinder 11; when the intake valve is open, the inside of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the plural right head blocks 4R (see FIG. 2) which are arranged in the front and back direction. The inside of the right exhaust manifold 22R and the respective right cylinders 11R are connected via exhaust ports (not shown) provided on the right side of the right head blocks 4R. The left exhaust manifold 22L is placed on the left side of the plural left head blocks 4L (see FIG. 2) which are arranged in the front and back direction. The inside of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inside of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine.

The intercooler 25, which is connected with the intake manifold 21, is supplied with cooling water by a cooling water pump (not shown), thereby to cool the intake air. The intake air supplied from the compressor unit 231 is pressurized and compressed, thereby to generate a compression heat and to be increased in temperature. The intercooler 25 performs heat exchange between the cooling water, which is supplied by the cooling water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there are placed, for example, the controller 26, which controls the entire engine 100, and a fuel pump 27 that supplies the fuel to the injector 8.

That is, the engine 100 includes the controller 26 placed in the intra-bank area 200 positioned between the first and second cylinder rows 111R and 111L. Also, the engine 100 includes the fuel pump 27 placed in the intra-bank area 200. The intra-bank area 200 may be, in a strict sense, a space area between the first and second cylinder rows 111R and 111L. However, in the present embodiment, the intra-bank area 200 widely includes the space area in the right and left direction between the right bank RB which includes the first cylinder row 111R, and the left bank LB which includes the second cylinder row 111L.

<2. Fuel System>

A fuel system that is provided in the engine 100 and that includes the fuel pump 27 is to be described in detail.

Figure 5:
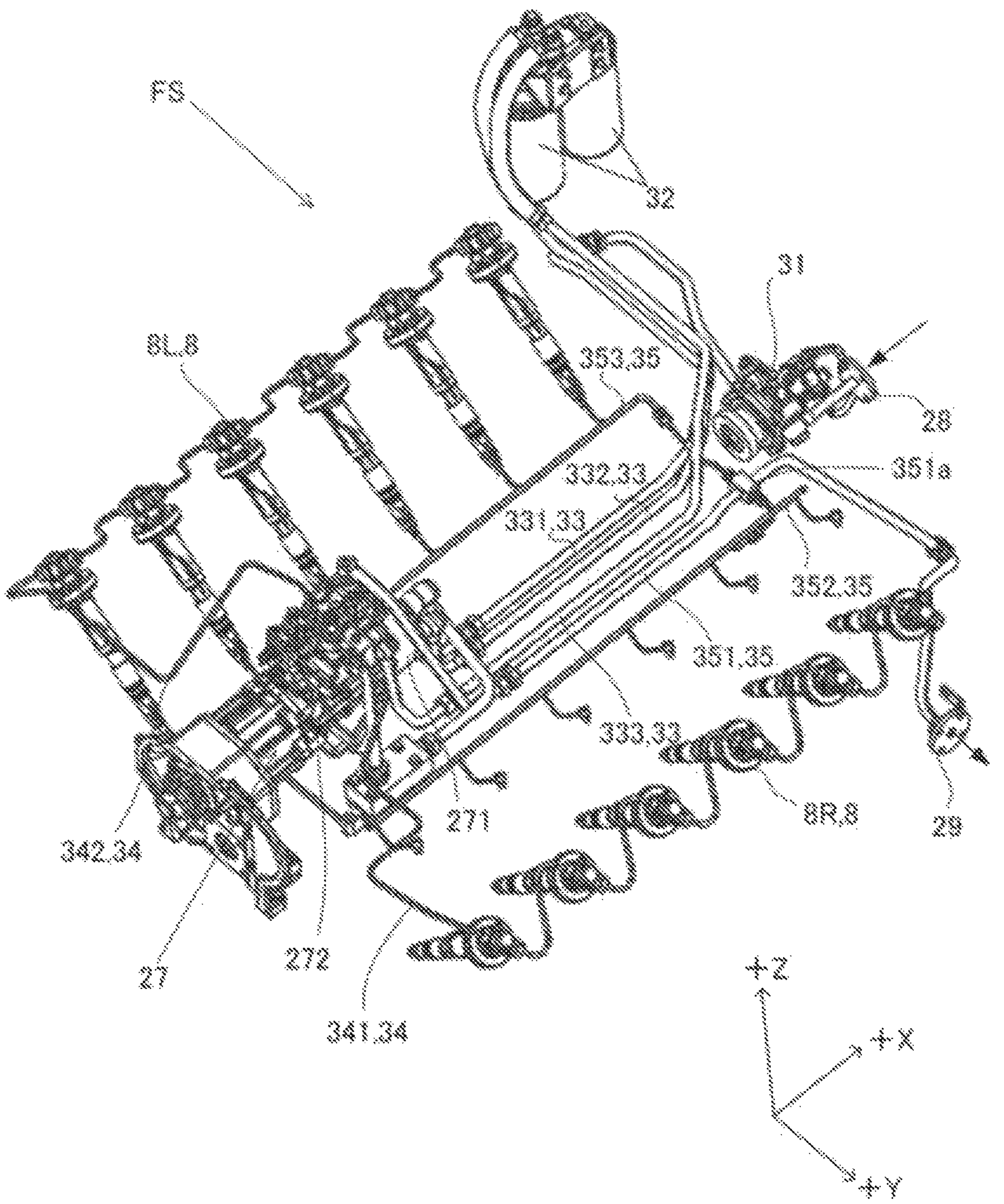
FIG. 5 is a schematic perspective view extracting and showing a fuel system provided in the engine.

FIG. 5 is a schematic perspective view extracting and showing a fuel system FS provided in the engine 100. In FIG. 5, the fuel tanked in a fuel tank (not shown) is supplied from a fuel inlet portion 28 to the engine 100. Further, part of fuel is returned from the engine 100 through a fuel outlet portion 29 to the fuel tank.

As shown in FIG. 5, the fuel system FS is provided, in addition to the injector 8 and fuel pump 27 described above, with an auxiliary pump 31, a fuel filter 32, a low-pressure fuel pipe 33, a high-pressure fuel pipe 34, and a fuel return pipe 35. As described above, the injector 8 includes six right injectors 8R and six left injectors 8L. The fuel pump 27 is driven by using the rotational power of the crankshaft 6. The auxiliary pump 31 assists in pumping the fuel at the time of starting the engine 100. The fuel pump 27 includes, in detail, a low-pressure fuel pump 271 and a high-pressure fuel pump 272.

The low-pressure fuel pipe 33 includes a first low-pressure fuel pipe 331, a second low-pressure fuel pipe 332, and a third low-pressure fuel pipe 333. The first low-pressure fuel pipe 331 connects the fuel inlet portion 28 with the low-pressure fuel pump 271 via the auxiliary pump 31. The second low-pressure fuel pipe 332 connects the low-pressure fuel pump 271 with the fuel filter 32. The third low-pressure fuel pipe 333 connects the fuel filter 32 with the high-pressure fuel pump 272.

In the present embodiment, the fuel filter 32 is configured to include two fuel filters placed in parallel, but this is an exemplification. The number of fuel filters may be properly modified, and may be one, three or more. Further, the configuration may be such that plural fuel filters are connected in series.

The high-pressure fuel pipe 34 includes a first high-pressure fuel pipe 341 and a second high-pressure fuel pipe 342. The first high-pressure fuel pipe 341 is a fuel pipe for the right bank RB, and connects the high-pressure fuel pump 272 with the plural (six in the present embodiment) right injectors 8R. The second high-pressure fuel pipe 342 is a fuel pipe for the left bank LB, and connects the high-pressure fuel pump 272 with the plural (six in the present embodiment) left injectors 8L.

The fuel return pipe 35 includes a first fuel return pipe 351, a second fuel return pipe 352, and a third fuel return pipe 353. The first fuel return pipe 351 connects the high-pressure fuel pump 272 with the fuel outlet portion 29. The second fuel return pipe 352 is a fuel pipe for the right bank RB, and is connected with each of the right head blocks 4R included in the right bank RB. Further, the second fuel return pipe 352 is connected to a merge portion 351*a* provided in the middle of the first fuel return pipe 351. At the merge portion 351*a*, the fuel flowing through the second fuel return pipe 352 merges with the fuel flowing through the first fuel return pipe 351. The third fuel return pipe 353 is a fuel pipe for the left bank LB, and is connected with each of the left head blocks 4L included in the left bank LB. Further, the third fuel return pipe 353 is connected to the merge portion 351*a* provided in the middle of the first fuel return pipe 351. At the merge portion 351*a*, the fuel flowing through the third fuel return pipe 353 merges with the fuel flowing through the first fuel return pipe 351.

According to the operation of the low-pressure fuel pump 271, the fuel supplied to the fuel inlet portion 28 of the engine 100 by a feed pump (not shown) enters the low-pressure fuel pump 271 through inside the first low-pressure fuel pipe 331, is pressurized, and is then sent through inside the second low-pressure fuel pipe 332 to the fuel filter 32. Any debris and dirt of the fuel sent to the fuel filter 32 are removed by the fuel filter 32. The fuel from which debris and the like have been removed is sent through inside the third low-pressure fuel pipe 333 to the high-pressure fuel pump 272.

The high-pressure fuel pump 272, which is fed with the fuel, discharges the fuel, at a high pressure, toward the first high-pressure fuel pipe 341 and the second high-pressure fuel pipe 342. The fuel passing through the first high-pressure fuel pipe 341 is distributed to each of the right injectors 8R placed at the right bank RB. The fuel passing through the second high-pressure fuel pipe 342 is distributed to each of the left injectors 8L placed at the left bank LB. Each of the injectors 8 injects the fuel to the combustion chamber at a given timing. It is preferable that the first high-pressure fuel pipe 341 and the second high-pressure fuel pipe 342 should be the same in length. This prevents the right injector 8R and the left injector 8L from having a gap in injection timing.

Further, the high-pressure fuel pump 272 returns any excess fuel via the first fuel return pipe 351 to the fuel tank. Also, to the second fuel return pipe 352, each of the right head blocks 4R returns the excess fuel not having been used for combustion. Further, to the third fuel return pipe 353, each of the left head blocks 4L returns the excess the fuel not having been used for combustion. The fuels returned to the second fuel return pipe 352 and the third fuel return pipe 353 are merged with the fuel of the first fuel return pipe 351 by the merge portion 351*a*, and are returned to the fuel tank.

<3. Electric System>

Figure 6:
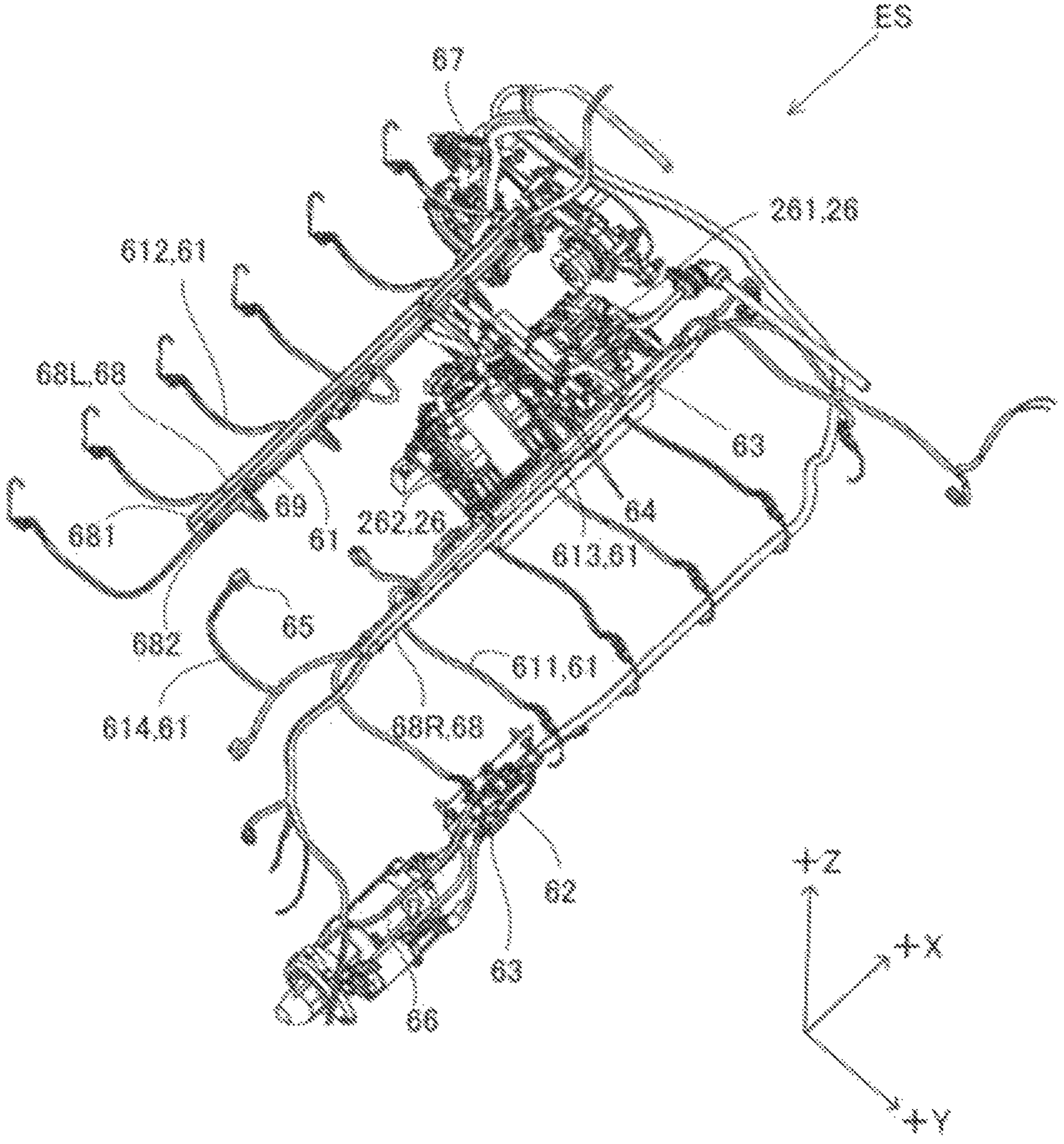
FIG. 6 is a schematic perspective view extracting and showing an electric system provided in the engine.

An electric system that is provided in the engine 100 and that includes the controller 26 is to be described in detail. FIG. 6 is a schematic perspective view extracting and showing an electric system ES provided in the engine 100. As shown in FIG. 6, the electric system ES includes various electric wires 61 such as electric wires that electrically connect the controller 26 to various portions of the engine 100. The engine 100's various portions that are electrically connected to the controller 26 include, for example, the injector 8 (see FIG. 5, etc.), a relay 62, a fuse box 63, a communication unit 64 for communication with the outside, and various sensors 65. The various sensors 65 include, for example, a pressure sensor, a temperature sensor, and a flowrate sensor.

In the present embodiment, the electric wires 61 include a power line, a control line, a signal line, and a communication line. At least part of the electric wires 61 is placed in the engine 100 as a bundle of plural electric wires, that is, a so-called wiring harness. In the present specification, the electric wire 61 is used in a broad sense, and includes an electric wire in a state of being made into the wire harness.

The electric wire 61 includes a right injector electric wire 611 which includes the control wire for the right injector 8R placed at the right bank RB. Further, the electric wire 61 includes a left injector electric wire 612 which includes the control wire for the left injector 8L placed at the left bank LB. Further, the electric wire 61 includes a communication unit electric wire 613 which includes a communication line for the communication unit 64. Further, the electric wire 61 includes a sensor electric wire 614 which includes a signal wire for the sensor 65.

Further, the electric wires 61 included in the electric system ES include power lines, for example, an electric wire that supplies power from a battery (not shown) to a starter 66 for starting the engine, and an electric wire that supplies power from an alternator 67 to various portions.

The controller 26 includes, in detail, a first controller 261 and a second controller 262. The first controller 261 and the second controller 262 are arranged in the front and back direction (crankshaft direction). In detail, the first controller 261 is placed forward of the second controller 262. One of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 configured as a sub-controller is connected with the first controller 261 by a communication line (electric wire 61), and is so provided as to be capable of communicating with the first controller 261. The second controller 262 executes a control operation according to an instruction from the first controller 261.

In the present embodiment, the first controller 261 controls the right injector 8R placed at the right bank RB. That is, the first controller 261 and each of the right injectors 8R are electrically connected by the right injector electric wire 611. Further, the second controller 262 controls the left injector 8L placed at the left bank LB. That is, the second controller 262 and each of the left injectors 8L are electrically connected by the left injector electric wire 612.

As shown in FIGS. 4 and 6, the engine 100 has a guide member 68 having a surface along which the electric wire 61 is placed. The guide member 68 is placed in the intra-bank area 200. Placing the guide member 68 can suppress bending of the electric wire 61. Further, providing the guide member 68 can orderly place the electric wires 61. Further, providing the guide member 68 can suppress an emission from causing an influence on a component present on the opposite side of the electric wire 61 across the guide member 68. Further, due to the guide member 68 being placed in the intra-bank area 200, a space inside the engine 100 can be effectively used as a space for placing the electric wire 61.

In detail, the guide member 68 is an L-shaped member extending in the front and back direction. The guide member 68 has a first plate-shaped portion 681 parallel to the up and down direction (see also FIG. 7 below) and a second plate-shaped portion 682 parallel to the right and left direction (see also FIG. 7 below). The electric wire 61 is mounted to the guide member 68 by means of a fastener 69 that is fixed to the second plate-shaped portion 682 of the guide member 68. Further, the first plate-shaped portion 681 does not have to be perfectly parallel to the up and down direction, and may be inclined in the range of 0° to 90° relative to the up and down direction. Similarly, the second plate-shaped portion 682 does not have to be perfectly parallel to the right and left direction, and may be inclined in the range of 0° to 90° relative to the right and left direction. That is, it is sufficient that the guide member 68 should be L-shaped to the extent that the first and second plate-shaped portions 681, 682 do not impair the function as the guide member 68.

In the present embodiment, the guide member 68 includes a right guide member 68R and a left guide member 68L.

With the first plate-shaped portion 681 mounted to the left side face of the right intake manifold 21R, the right guide member 68R is placed along the right intake manifold 21R (see FIG. 4). With the first plate-shaped portion 681 mounted to the right side face of the left intake manifold 21L, the left guide member 68L is placed along the left intake manifold 21L (see FIG. 4). The right guide member 68R and the left guide member 68L, having the same height position in the up and down direction, are spaced apart from each other in the right and left direction.

In the present embodiment, part of the electric wires 61 included in the electric system ES is placed at the guide member 68. For example, the electric wire 61 placed along the right guide member 68R includes part of the right injector electric wire 611 extending from the first controller 261. Further, for example, the electric wire 61 placed along the left guide member 68L includes part of the left injector electric wire 612 extending from the second controller 262.

Figure 7:
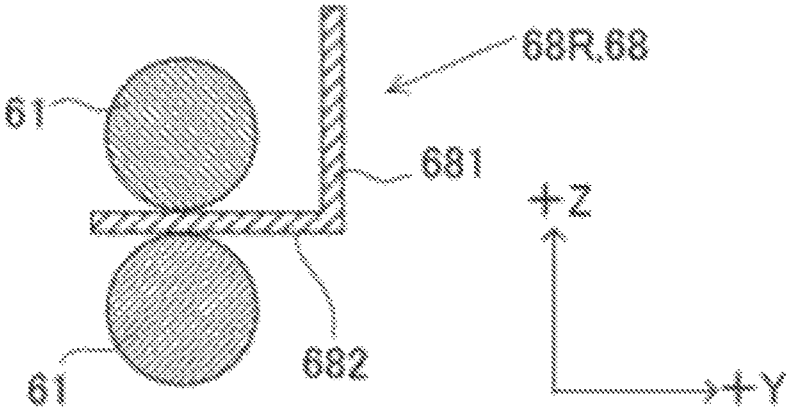
FIG. 7 is a diagram for explaining about an electric wire's placement in a guide member.

FIG. 7 is a diagram for explaining about the electric wire 61's placement in the guide member 68. Although FIG. 7 shows an example seen when the guide member 68 is the right guide member 68R, the same is true for the left guide member 68L. It is sufficient that, as shown in FIG. 7, the electric wires 61 should be placed separately on the upper and lower faces of the second plate-shaped portion 682 of the guide member 68. For example, it is preferable that the electric wires 61, which are prone to an interference due to an electromagnetic interference, should be placed separately on the upper and lower faces. It is preferable that, for example, among the electric wires 61, the power line for supplying power and the signal line for the sensor 65 should be so placed as to be distributed up and down. This can reduce any adverse effect of an emission. Further, it is preferable that the guide member 68 should include a metal that can shield an electromagnetic wave.

Figure 8:
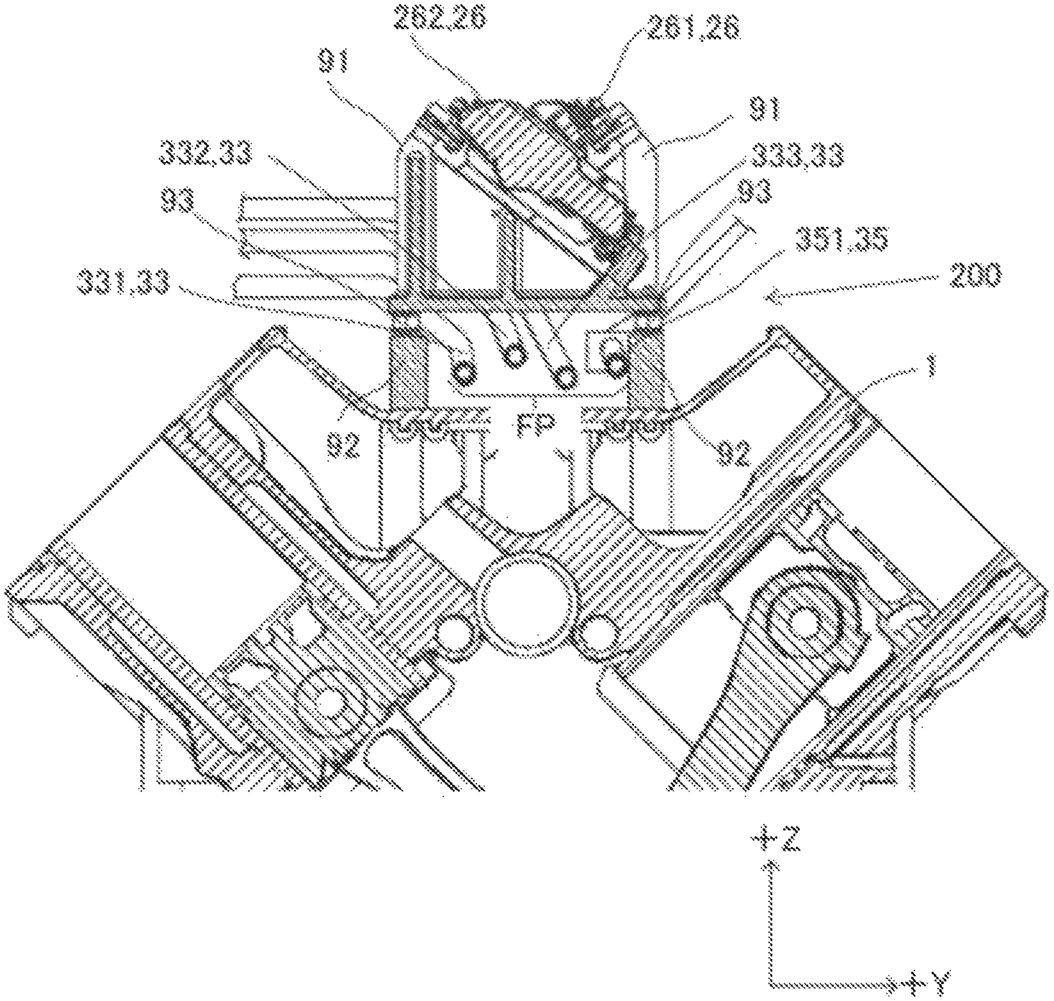
FIG. 8 is a schematic cross-sectional view showing a configuration around a controller.

FIG. 8 is a schematic cross-sectional view showing the configuration around the controller 26 placed in the intra-bank area 200. As shown in FIG. 8, the controller 26 is placed in a manner to be inclined in plan view from the front and back direction. That is, in plan view, the controller 26 is placed in a manner to be inclined from the crankshaft direction. The controller 26 is placed in a manner to be inclined relative to the up and down direction of the engine 100 in plan view from the crankshaft direction. Creating the above placement can place the controller 26 in the intra-bank area 200 with a narrower width in the right and left direction.

The electric wire 61 placed along the surface of the guide member 68 includes an electric wire connected to the controller 26. In the present embodiment, the guide member 68 is provided at a vertical height higher than the controller 26. That is, the controller 26 and guide member 68 are displaced in the up and down direction. The guide member 68 may be placed at the vertical height lower than the controller 26.

In detail, the first controller 261 is so placed as to be inclined more upward toward the right. Then, the electric wire 61 extends from the upper portion (upper right end) of the first controller 261 toward the right guide member 68R placed on the right side of the first controller 261. Creating the above configuration can shorten the length of the electric wire 61 extending from the first controller 261 to the right guide member 68R. Also, creating the above configuration can gentle the bending of the electric wire 61.

Further, the second controller 262 is so placed as to be inclined more upward toward the left. Then, the electric wire 61 extends from the upper portion (upper left end) of the second controller 262 toward the left guide member 68L placed on the left side of the second controller 262. Creating the above configuration can shorten the length of the electric wire 61 extending from the second controller 262 to the left guide member 68L. Also, creating the above configuration can gentle the bending of the electric wire 61.

As shown in FIG. 8, a fuel pipe FP is placed below the controller 26. That is, the engine 100 is provided with the fuel pipe FP which is placed below the controller 26 in the intra-bank area 200 and is included in a passage of the fuel. Creating the above configuration can efficiently use the intra-bank area 200 for placing the component, making it possible to downsize the engine 100. In the present embodiment, part of the first low-pressure fuel pipe 331, part of the second low-pressure fuel pipe 332, part of the third low-pressure fuel pipe 333, and part of the first fuel return pipe 351 are included in the fuel pipe FP. However, this is an exemplification, and the type and number of fuel pipes FP may be changed as needed.

In the present embodiment, a bulkhead 91 is placed between the controller 26 and the fuel pipe FP. In detail, the bulkhead 91 is placed between the controller 26 and the fuel pipe FP in the up and down direction.

In detail, the bulkhead 91 is a controller mounting base to which the controller 26 is mounted.

In the intra-bank area 200, two support blocks 92 are placed on the upper face of the cylinder block 1 in a manner to be spaced apart in the right and left direction. The controller mounting base 91 is supported by the two support blocks 92. In detail, the controller mounting base 91 is supported by the support blocks 92 via a vibration-proof member 93 such as a vibration-proof rubber. The fuel pipe FP passes through a space surrounded by the upper face of the cylinder block 1, the lower face of the controller mounting base 91, and the mutually opposing side faces of the two support blocks 92.

Figure 9:
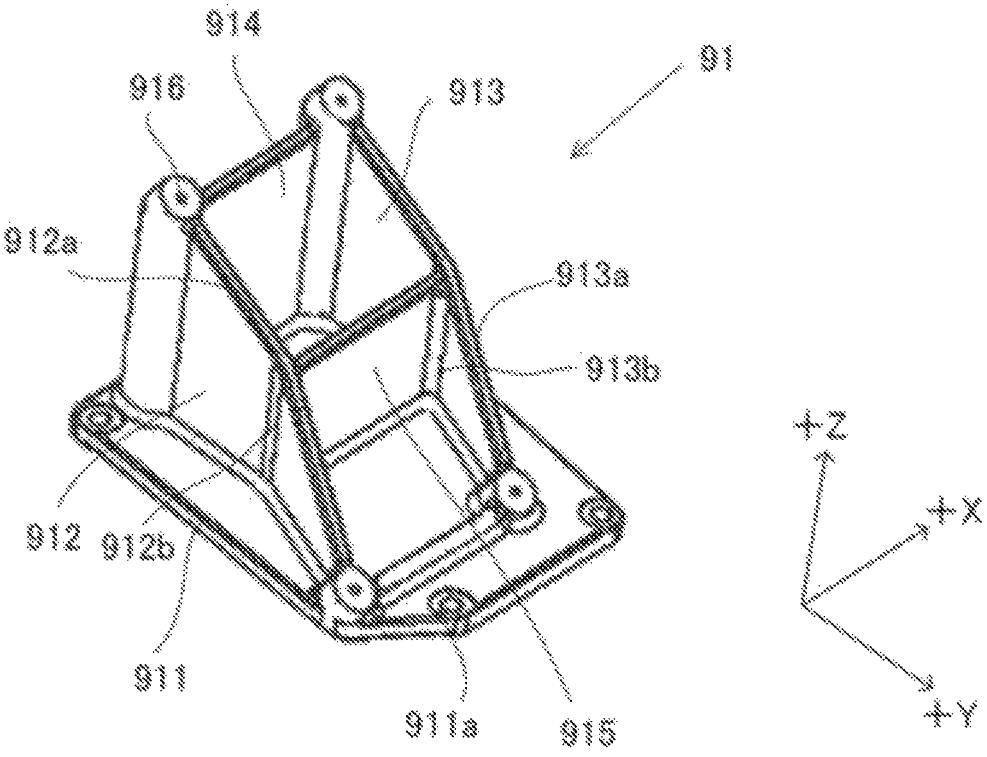
FIG. 9 is a schematic perspective view showing a configuration of a controller mounting base.

FIG. 9 is a schematic perspective view showing the configuration of the controller mounting base 91. The controller mounting bases 91, to which the first and second controllers 261 and 262 are mounted, are identical in shape. However, the controller mounting bases 91 are used with the right and left directions reversed for mounting the first controller 261 and the second controller 262. FIG. 9 shows the direction seen when mounting the second controller 262.

As shown in FIG. 9, the controller mounting base 91 has a base portion 911, a first wall portion 912, a second wall portion 913, a third wall portion 914, and a partition wall portion 915. The base portion 911 is plate-shaped, spreading in a direction perpendicular to the up and down direction. The base portion 911 is provided with a plurality of base portion screw insertion holes 911*a* for fastening, by a screw, the base portion 911 to a pair of right and left support blocks 92.

The first wall portion 912 and the second wall portion 913 are identical in shape, and are placed in a manner to be spaced apart in the front and back direction. The first wall portion 912 and the second wall portion 913 are triangular in plan view from the front and back direction, and have inclined portions 912*a* and 913*a*. The controller 26 is placed along these inclined portions 912*a* and 913*a*, resulting in a state of being inclined. The first wall portion 912 and the second wall portion 913 have bend portions 912*b* and 913*b* in the middle portion in the right and left direction. Due to the bend portions 912*b* and 913*b* being provided, the first wall portion 912 and the second wall portion 913 are V-shaped in plan view from above. Creating the configuration of providing the bend portions 912*b* and 913*b* can improve the rigidity of the controller mounting base 91.

The third wall portion 914 connects together one end portions that are among the first wall portion 912 and second wall portion 913's both end portions in the right and left direction and that are on the higher sides. In the example shown in FIG. 9, the third wall portion 914 connects together the left end portions. The partition wall portion 915 connects together the bend portion 912*b* of the first wall portion 912 with the bend portion 913*b* of the second wall portion 913. Creating the configuration of providing the third wall portion 914 and the partition wall portion 915 can improve the rigidity of the controller mounting base 91.

The right and left end portions of the first wall portion 912 and second wall portion 913 are provided with boss portions 916 for screw-fastening, and the controller 26 is mounted to the controller mounting base 91 using the boss portions 916. The controller 26 is preferably mounted to the controller mounting base 91 by using a vibration-proof member (not shown) such as vibration-proof rubber.

<4. Composition of Intra-Bank Area>

Figure 10:
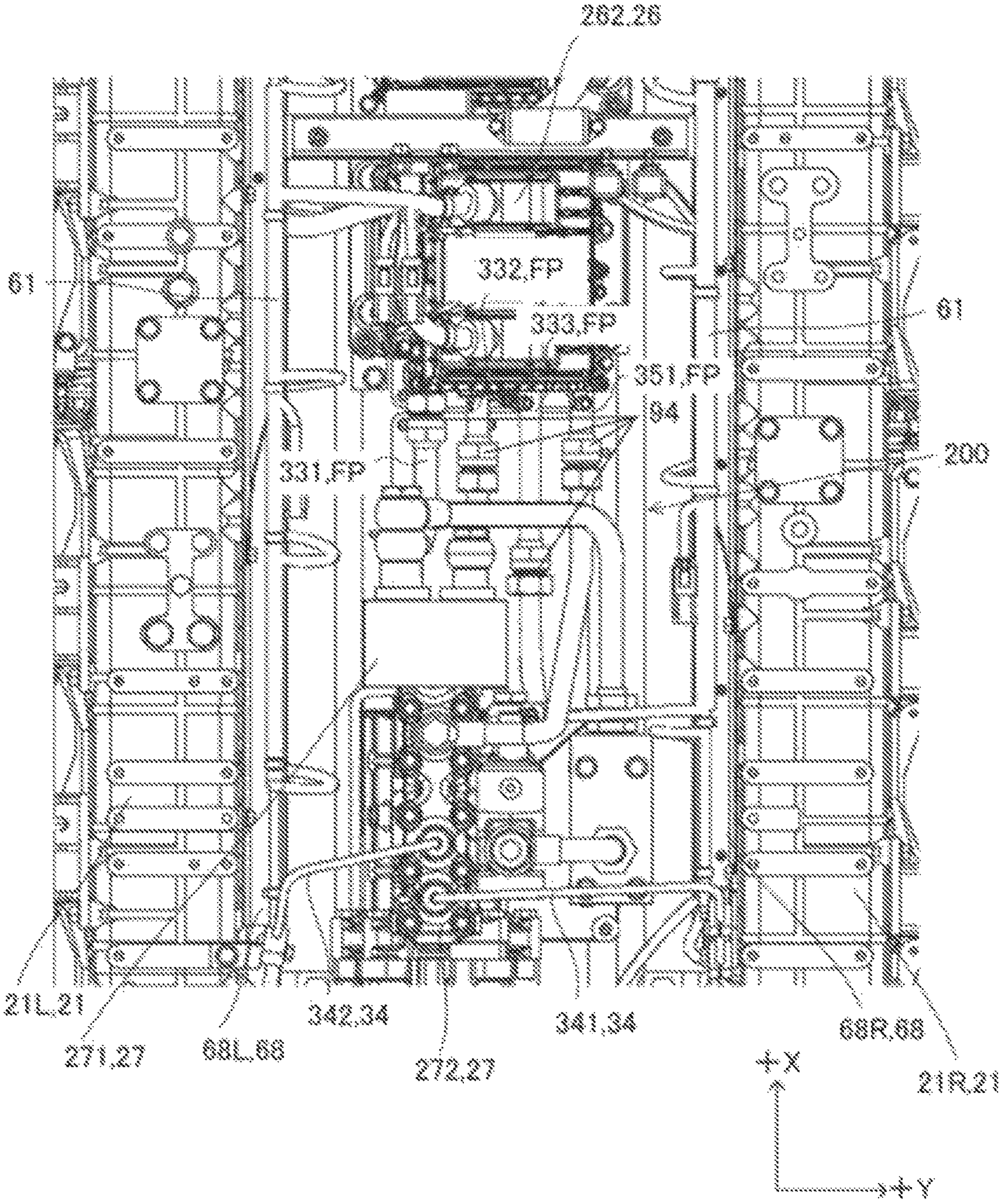
FIG. 10 is an enlarged view of an area between the controller and the fuel pump which are placed in an intra-bank area.

FIG. 10 shows an enlarged view of an area between controller 26 and the fuel pump 27 which are placed in the intra-bank area 200. In other words, FIG. 10 is an enlarged view of part of FIG. 4.

As shown in FIG. 10, in plan view from the up and down direction, a joint portion 94 possessed by the fuel pipe FP is displaced from the controller 26. In the present embodiment, the joint portion 94 is a portion where pipes are joined together and where a joint member such as nut is placed.

In the present embodiment, the engine 100 can be downsized due to the controller 26 and the fuel pipe FP being placed in the intra-bank area 200. And, in plan view from the up and down direction, the joint portion 94 is displaced from the controller 26 thereby to prevent overlapping with the controller 26; thus, when the fuel pipe FP is to be disassembled for maintenance, etc., the disassembling work can be performed without removing the controller 26. Further, the fuel pipe FP is placed below the controller 26, thus making it possible to remove the controller 26 without being obstructed by the fuel pipe FP. That is, while downsizing the engine 100, the present invention can improve maintainability.

The present embodiment is provided with a plurality of fuel pipes FPs extending in the same direction. For these plural fuel pipes FP, the joint portions 94 of the fuel pipes FP adjacent to each other are displaced in the direction in which the fuel pipes FP extend. In the present embodiment, the joint portions 94 of the adjacent fuel pipes FP are displaced in the crankshaft direction.

In the present embodiment, the direction in which the fuel pipe FP, which is placed below the controller 26, extends is in the front and back direction. In other words, the direction in which the fuel pipe FP extends is in the crankshaft direction. In the present embodiment, the joint portions 94 of the adjacent fuel pipes FP are displaced from each other in the crankshaft direction.

In detail, the joint portion 94 of the first low-pressure fuel pipe 331 is placed forward of the joint portion 94 of the second low-pressure fuel pipe 332 which is placed right next in plan view from the up and down direction. The joint portion 94 of the second low-pressure fuel pipe 332 is placed forward of the joint portion 94 of the third low-pressure fuel pipe 333 which is placed right next in plan view from the up and down direction. The joint portion 94 of the third low-pressure fuel pipe 333 is placed behind the joint portion 94 of the first fuel return pipe 351 which is placed right next in plan view from the up and down direction. In the present embodiment, the joint portion 94 of the second low-pressure fuel pipe 332 and the joint portion 94 of the first fuel return pipe 351 are in the same position in the front and back direction, but are not adjacent to each other. Due to this; although the joint portion 94 of the second low-pressure fuel pipe 332 and the joint portion 94 of the first fuel return pipe 351 are in the same position in the front and back direction, such a problem that the joint portions 94 being close to each other makes it difficult to insert a tool is not caused.

In the present embodiment, the plurality of fuel pipes FPs are arranged in the right and left direction in plan view from the up and down direction. However, the direction in which the fuel pipe FP placed below the controller 26 extends is not limited to the front and back direction. In plan view from the up and down direction, the direction in which the fuel pipes extend may be a first direction inclined relative to the front and back direction, and the plurality of fuel pipes may be so configured as to be arranged in a second direction orthogonal to the first direction. In this case, it is preferable that the joint portions of the adjacent fuel pipes should be displaced from each other in the first direction.

As shown in FIG. 4, the engine 100 provided with the fuel pump 27 that is placed in the intra-bank area 200, and that is arranged in the crankshaft direction (front to back) together with the controller 26.

The fuel pump 27 is connected with the fuel pipe FP via the joint portion 94. That is, the engine 100 is provided with the fuel pump 27 that is connected via the joint portion 94 to the fuel pipe FP.

In detail, the pipe extending from the body of the fuel pump 27 is connected with the fuel pipe FP by the joint portion 94. Placing the joint portion 94 as close to the body of the fuel pump 27 as possible can reduce the size of taking out the fuel pump 27. This can improve the workability.

<5. Notes, Etc.>

The various technical features disclosed in the present specification can be modified in various ways without departing from the gist of the technical creation thereof. That is, the above embodiments should be considered exemplary in all respects and not restrictive. Further, the plural embodiments and modified examples shown in the present specification may be combined to the extent possible.

REFERENCE SIGNS LIST

6: crankshaft
26: controller
27: fuel pump
61: electric wire
68: guide member
100: engine
91: bulkhead, controller mounting base
94: joint portion
111R: right cylinder row, first cylinder row
111L: left cylinder row, second cylinder row
200: intra-bank area
331: first low-pressure fuel pipe, fuel pipe
332: second low-pressure fuel pipe, fuel pipe
333: third low-pressure fuel pipe, fuel pipe
351: first fuel return pipe, fuel pipe
FP: fuel pipe

The invention claimed is:

1. An engine provided with a first cylinder row and a second cylinder row, the engine comprising:

a cylinder block;

a controller that is positioned in an intra-bank area between the first cylinder row and the second cylinder row, between the cylinder block and a distal end of the first cylinder row displaced from the cylinder block, and between the cylinder block and a distal end of the second cylinder row displaced from the cylinder block; and a fuel pipe that is positioned below the controller in the intra-bank area and configured to enable a passage of a fuel, and wherein, in a plan view from an up and down direction, a joint portion possessed by the fuel pipe is displaced from the controller.

2. The engine as claimed in claim 1, comprising:

a plurality of fuel pipes extending in a same direction, included as the fuel pipe, and wherein the joint portions of the fuel pipes adjacent to each other are displaced in a direction in which the fuel pipes extend.

3. The engine as claimed in claim 2, wherein the direction in which the fuel pipes extend is a crankshaft direction.

4. The engine as claimed in claim 1, comprising:

a fuel pump that is positioned in the intra-bank area, and that is arranged in a crankshaft direction together with the controller.

5. The engine as claimed in claim 4, wherein the fuel pump is connected with the fuel pipe via the joint portion.

6. The engine as claimed in claim 1, comprising:

a fuel pump that is positioned in the intra-bank area, and that is connected with the fuel pipe via the joint portion.

7. The engine as claimed in claim 1, comprising:

a guide member that is positioned in the intra-bank area, and that has a surface along which an electrical wire is positioned.

8. The engine as claimed in claim 1, wherein the controller is positioned in a manner to be inclined in a plan view from a crankshaft direction.

9. The engine as claimed in claim 7, wherein:

the controller is positioned in a manner to be inclined in a plan view from a crankshaft direction, and the electric wire includes an electric wire connected to the controller.

10. The engine as claimed in claim 1, wherein a bulkhead is positioned between the controller and the fuel pipe.

11. The engine as claimed in claim 10, wherein the bulkhead is a controller mounting base to which the controller is mounted.

12. The engine as claimed in claim 1, wherein the joint portion is positioned in the intra-bank area.

13. An engine provided with a first cylinder row and a second cylinder row, the engine comprising:

a controller that is positioned in an intra-bank area between the first cylinder row and the second cylinder row; and a guide member that is positioned in the intra-bank area, and that has a surface along which an electrical wire is placed, wherein the guide member is configured to reduce passage of an electromagnetic wave through the guide member.

14. The engine as claimed in claim 13, wherein the guide member is configured to mount the electrical wire to the surface via a fastener.

15. The engine as claimed in claim 13, wherein the guide member includes a first portion and a second portion, the first portion at an angle to the second portion.

16. The engine as claimed in claim 13, wherein the guide member includes a metal.

17. The engine as claimed in claim 13, further comprising an intake manifold, wherein the guide member is mounted to the intake manifold.

* * * * *